United States Patent [19]

Capers et al.

[11] Patent Number: 4,678,392
[45] Date of Patent: Jul. 7, 1987

[54] WHEEL LIFT FOR A TOW TRUCK

[75] Inventors: Jerry W. Capers, Fort Worth; Donald L. Capers, Saginaw; Douglas W. Capers, Lakeside, all of Tex.

[73] Assignee: Hydra-Tech, Inc., Fort Worth, Tex.

[21] Appl. No.: 778,366

[22] Filed: Sep. 20, 1985

[51] Int. Cl.$^4$ .............................................. B60P 3/06
[52] U.S. Cl. ................................... 414/563; 280/402; 414/917
[58] Field of Search ................ 414/563, 917; 280/402

[56] References Cited

U.S. PATENT DOCUMENTS

| | | | |
|---|---|---|---|
| 2,564,111 | 8/1951 | Kimball | 414/563 |
| 3,927,237 | 12/1975 | Schaedler | 414/563 |
| 4,034,873 | 7/1977 | Haring | 414/563 |
| 4,383,807 | 5/1983 | Bubik | 414/563 |
| 4,473,237 | 9/1984 | Lind | 414/563 |
| 4,473,334 | 9/1984 | Brown | 414/563 |
| 4,564,207 | 1/1986 | Russ et al. | 414/563 X |

*Primary Examiner*—L. J. Paperner
*Assistant Examiner*—Stuart J. Millman
*Attorney, Agent, or Firm*—James E. Bradley

[57] ABSTRACT

A wheel lifting unit for mounting to a tow truck has a base that is carried by the truck under the bed. An extending device will retract and extend the base. A telescoping member, which also retracts and extends, is mounted to the base. The telescoping member includes a neck member that pivotally connects to arms mounted to the base. The neck member will also move between retracted and extended positions. Lateral extension members are located at the end of the telescoping member assembly. Wheel supports on the lateral extension members incline outwardly to accommodate different wheel sizes.

17 Claims, 9 Drawing Figures

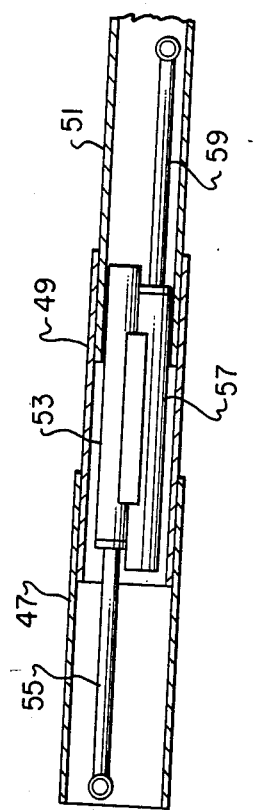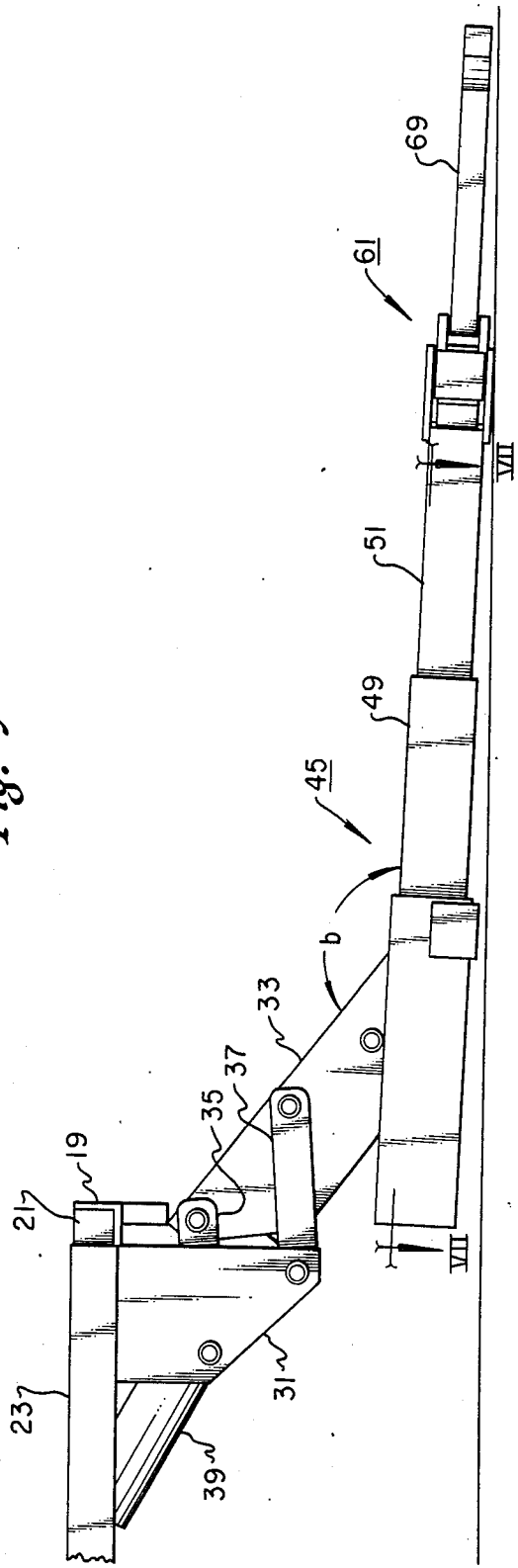

WHEEL LIFT FOR A TOW TRUCK

BACKGROUND OF THE INVENTION

1. Field of the Invention

This invention relates in general to devices for lifting vehicles for towing, and in particular to an apparatus mounted to a tow truck for lifting the wheels of a vehicle for towing.

2. Description of the Prior Art

Tow trucks are used extensively for towing disables vehicles, wrecked vehicles, and illegally parked vehicles. Generally, these tow trucks have a mast extending upwardly from a bed with a cable connected to a winch and reeved over the mast. A sling is extended under the end of the vehicle to be towed and connections are made to portions of the frame.

Many sports cars and newer automobiles, however, cannot be towed with a conventional sling type tow truck. Damage to the body or other components may occur. To handle these types of vehicles, wheel lifts have been developed. Generally, a wheel lift has a telescoping member that will extend and retract rearwardly from the tow truck. Lateral supports extend outwardly from the rearward end of the telescoping member for supporting the wheels of the vehicle. The telescoping member can be raised hydraulically to tow the vehicle.

There are a number of wheel lifts available on the market, but many suffer from deficiencies. In one type, the tow truck is capable only of towing cars by the wheels, and it does not have sufficient room to mount a mast for using conventional slings. There are still many older cars and heavier vehicles that are better towed by a sling than by a wheel lift. There are types that can be mounted to tow trucks by using both the sling and the wheel lift. However, normally the wheel lift does not sufficiently collapse to avoid interference with the operation of the sling. Often, the components must be removed from the wheel lifts, and stored to be able to use the sling. The wheel lifts are not readily adaptable to existing tow trucks having slings. Also, often the wheel lifts are cumbersome to operate, requiring too much time to pick up and secure a vehicle.

SUMMARY OF THE INVENTION

The wheel lift apparatus of this invention has a base carried by the truck under the bed. The base is movable longitudinally under the vehicle between the retracted and extended positions. A telescoping unit is mounted to the base for movement with it. The telescoping unit will extend outwardly independent of the retraction and extension movement of the base. Lateral supports extend outwardly from the rearward end of the telescoping unit.

The telescoping unit is connected to the base by a neck member which is pivotally supported on the base. The pivotal support allows the neck member to rotate in a generally circular path between an upper retracted position and a lower extended position. Consequently, for storage, the base, neck member and telescoping unit all will independently retract to fold substantially the entire assembly under the bed.

The wheel supports on the lateral member are rigid angled members. The free or outer end of the wheel support extends at an obtuse angle with respect to the end that is secured to the lateral members. This angle accommodates different wheel sizes.

BRIEF DESCRIPTION OF THE DRAWINGS

FIG. 6 is a side view of telescoping member and neck assembly of the wheel lift apparatus of FIG. 1, shown in the extended position.

FIG. 7 is a sectional view of the wheel lift apparatus as shown in FIG. 6, taken along the line VII—VII.

DESCRIPTION OF THE PREFERRED EMBODIMENT

Figure 1:
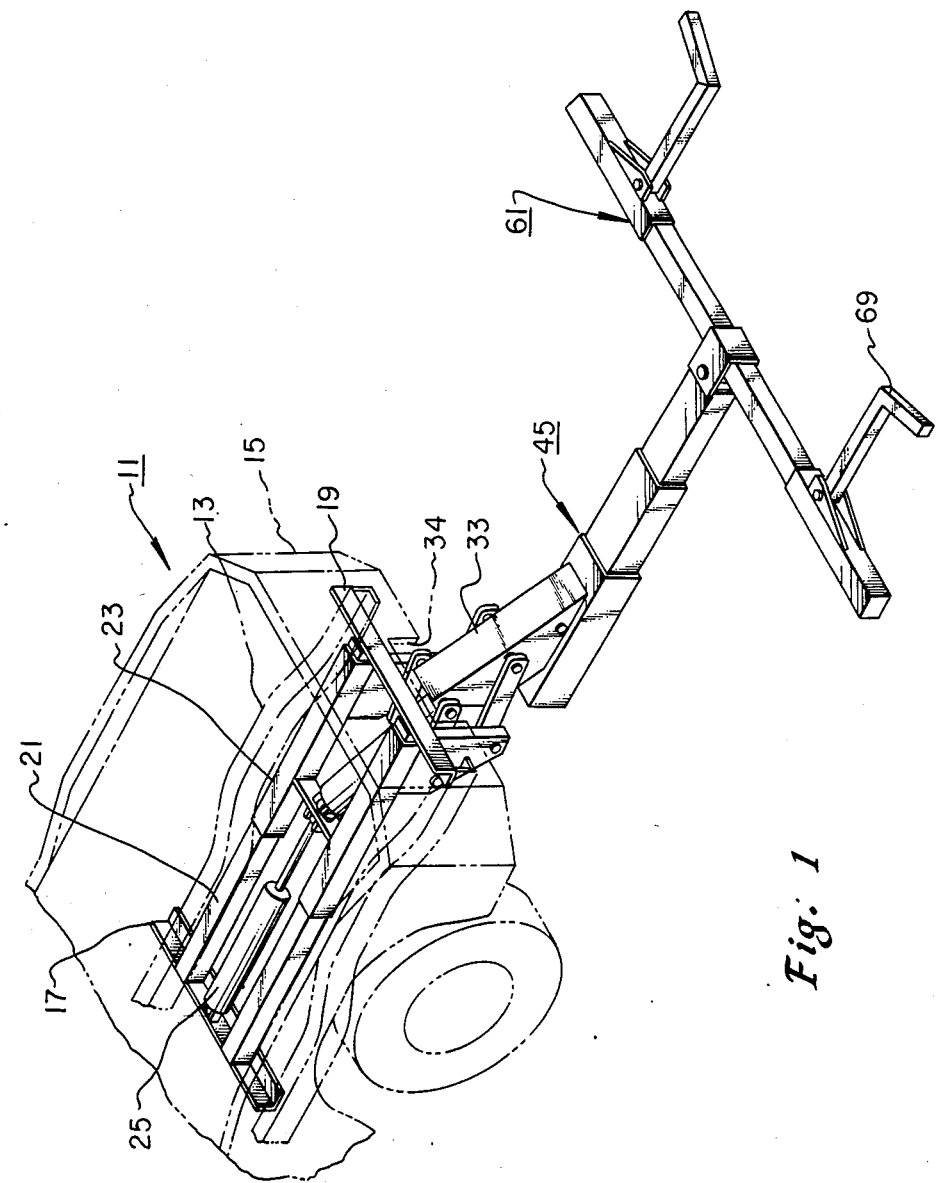
FIG. 1 is a perspective view of a wheel lift apparatus constructed in accordance with this invention, shown in a fully extended position.

Referring to FIG. 1 a tow truck 11 has conventional frame members 13 and a bed 15, both shown in phantom lines. The frame members 13 comprise two beams extending longitudinally. The wheel lift apparatus of this invention includes two cross members 17 and 19 mounted to the frame members 13 under the bed 15. The cross members 17 and 19 are angle brackets, and may be secured by bolting or otherwise to the frame members 13. A pair of rails 21 extend longitudinally parallel to the longitudinal axis (not shown) of the vehicle between the cross members 17 and 19. As shown also in FIG. 2, rails 21 are straight square tubular members, spaced apart, but spaced apart less than the distance between the two frame members 13.

A base 23 is slidably carried on the frame members 13. Base 23 comprises two square tubular members of larger dimensions than the rails 21 for sliding over the rails 21. A hydraulic cylinder 25 has one end connected to the forward cross member 17. The shaft 27 for the hydraulic cylinder 25 is connected to a cross brace 29 extending between the two tubular members of the base 23. Hydraulic cylinder 25 and the rails 21 serve as extension means for extending the base 23 along the axis of the tow truck 11. The extension is preferably about 16 inches. FIG. 4 shows the base 23 in a retracted position, and FIGS. 1, 2, 3, 5 and 6 show the base 23 in an extended position.

Figure 3:
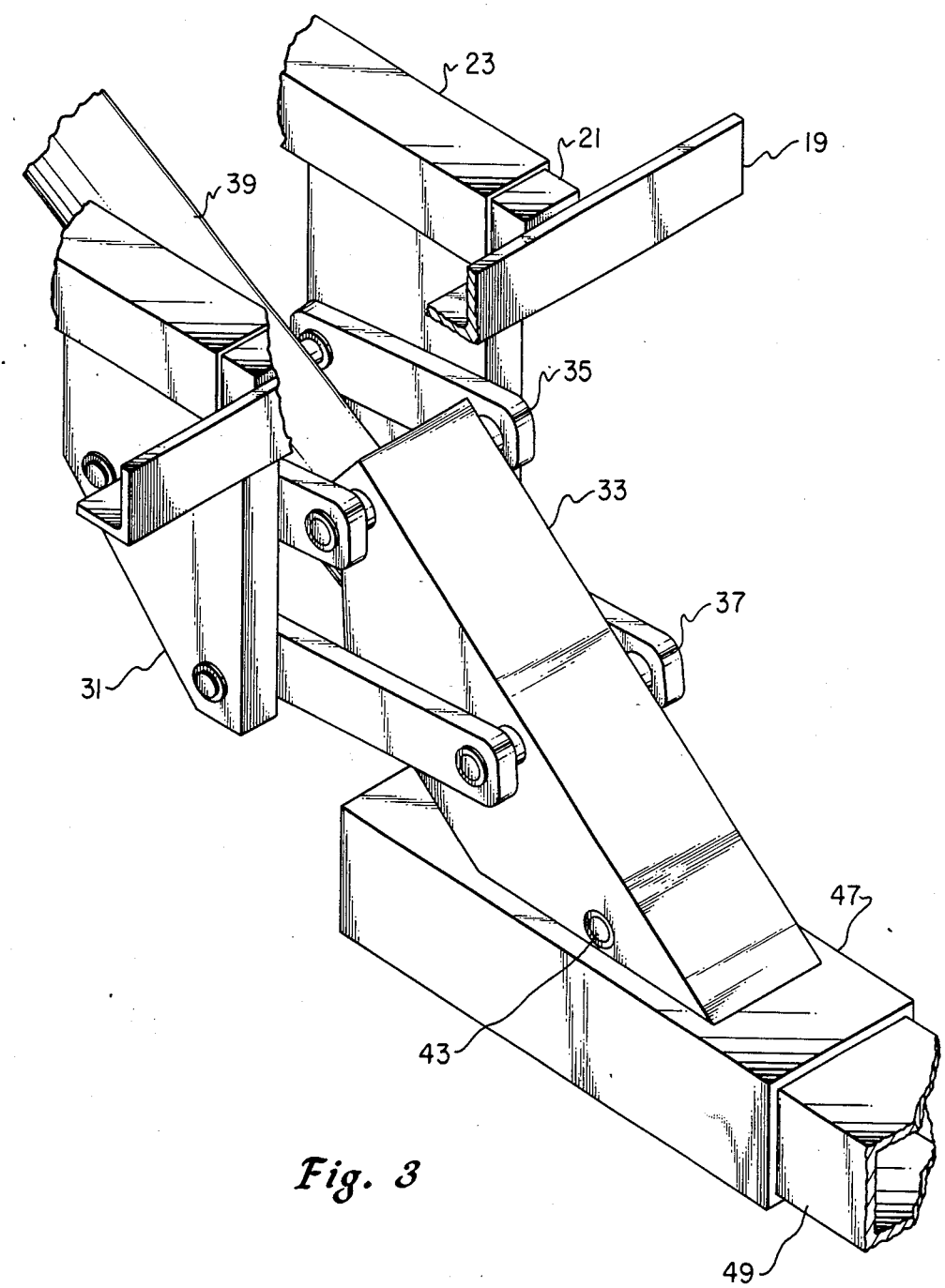
FIG. 3 is a partial perspective view of the pivotal support or neck assembly for the wheel lift apparatus of FIG. 1, shown in a fully extended position.
Figure 4:
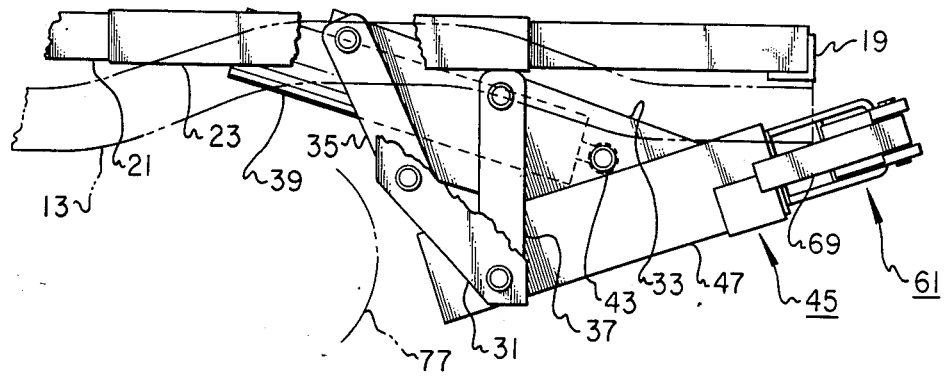
FIG. 4 is a side view of the wheel lift apparatus of FIG. 1, with portions broken away, and shown in a fully retracted position.
Figure 5:
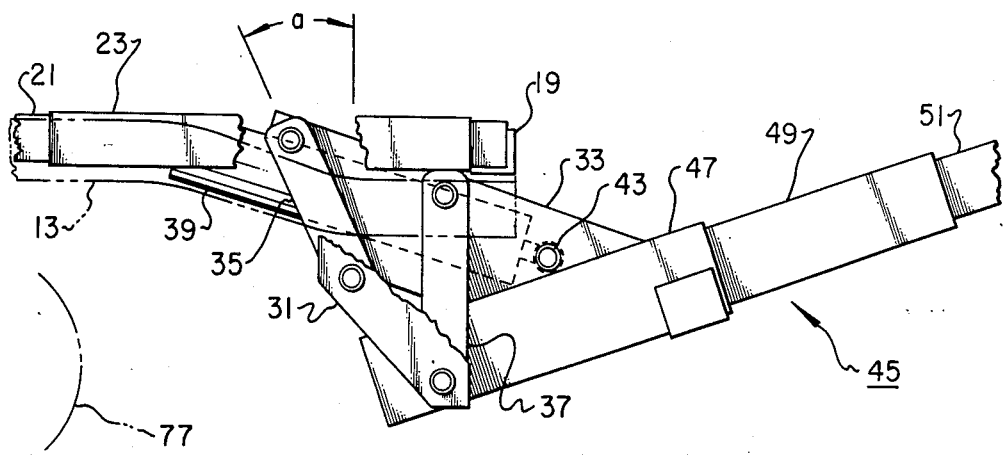
FIG. 5 is a view similar to FIG. 4, but showing the base and the telescoping member extended.

Referring to FIG. 3, a pair of arms 31 are rigidly secured to the base 23 and depend downwardly. Each arm 31 is a metal plate. A square tubular neck 33 is carried between the arms 31. Neck 33 is connected to the arm 31 by a pivotal support means that allows the neck 33 to move in a generally elliptical path between a retracted position, as shown in FIGS. 4 and 5, and an extended position as shown in FIGS. 1, 3 and 6. In the extended position, the neck 33 protrudes through an opening 34 in the rear of the bed 15. Referring still to FIG. 3, the pivotal suppport means comprises two linkage bars 35 and 37 on each side. Each linkage bar 35 and 37 has one end pivotally connected to an arm 31 and the other end pivotally connected to the neck 37. As shown in FIG. 5, the forward linkage bar 35 has its ends pinned to the neck 33 and arm 31 higher than the pinned connections of the rearward linkage bar 37. Bar 37 is slightly longer than bar 35, being about 12 inches and 10 inches respectively in the preferred embodiment. While retracted, the forward linkage bar 35 will be inclined with respect to the vertical at an angle a which is approximately 25 degrees. The rearward linkage bar 37 in the retracted position is substantially vertical. In the extended position, as shown in FIG. 6, each linkage bar 35 and 37 is at a small and slightly different positive angle relative to the horizontal or longitudinal axis of the tow truck 11. The rearward linkage bar 37 thus rotates almost 90° and the forward linkage bar almost 115° when moving from the retracted to the extended position.

Figure 2:
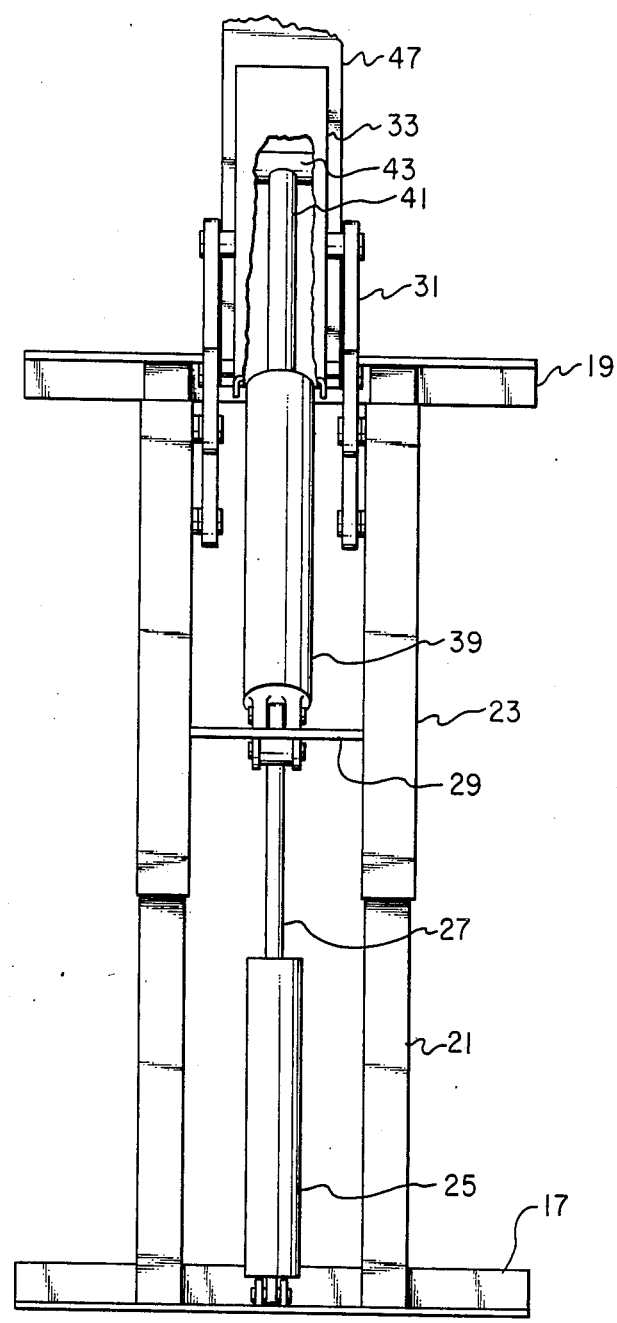
FIG. 2 is a top view of the base and wheels of the wheel lift apparatus of FIG. 1, shown in an extended position.

The movement between the retracted and extended positions of the neck 33 is handled by a hydraulic cylinder 39. As shown in FIG. 2, the upper end of hydraulic cylinder 39 is connected to the cross brace 29 of the base 23. The shaft 41 of the hydraulic cylinder 39 is connected to a pin 43 located at the rearward end of neck 33. The axis of neck 33 when retracted is about 20° and about 40° when extended, relative to frame members 13.

Referring to FIG. 6, a telescoping member assembly 45 is mounted to the rearward end of the neck 33. The telescoping member assembly 45 includes a forward member 47 which is rigidly connected to the neck 33. The neck 33 joins the forward member 47 between the ends of the forward member 47 and at an inclined angle. The angle b measured rearwardly from the intersection of the neck 33 and forward member 47 is an obtuse angle, preferably about 140 degrees. The angle b places the forward member 47 in a position only slightly downward when the neck 33 is in the fully extended position as shown in FIG. 6.

The forward member 47 is a square tubular member dimensioned to closely receive a central member 49, which is also a square tube. Similarly the central member 49 receives a square tubular rearward member 51. As shown in FIG. 7, a hydraulic cylinder 53 is mounted in the central member 49. Its shaft 55 extends into the forward member 47 and is connected to it. There is another hydraulic cylinder 57 which faces in the opposite direction from hydraulic cylinder 53. It is rigidly mounted to the hydraulic cylinder 53. Its shaft faces rearwardly and is secured to the rearward member 51. Application of hydraulic fluid pressure to the cylinders 53 and 57 simultaneously will cause them to move in opposite directions, retracting or extending the three members 47, 49 and 51. FIG. 6 shows the three members 47, 49 and 51 extended and FIG. 4 shows them retracted.

Figure 8:
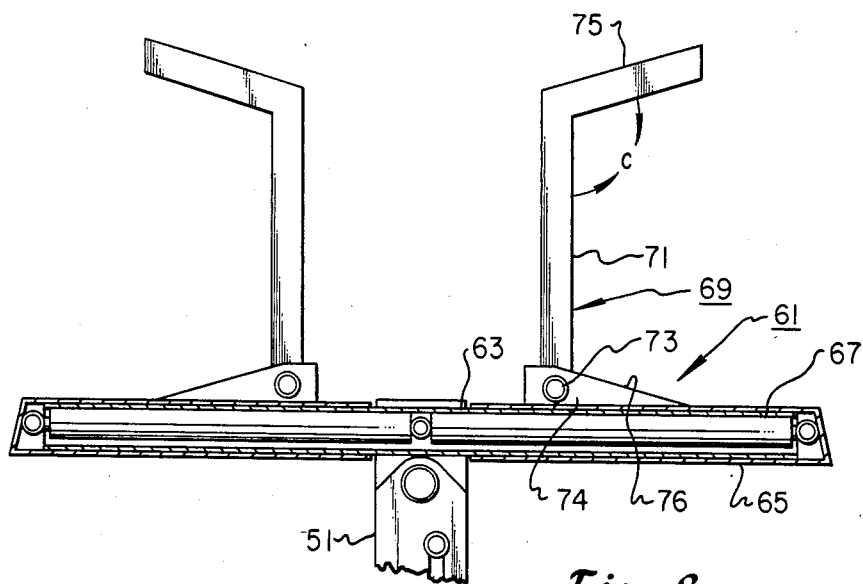
FIG. 8 is a top view, with portions sectioned, of the lateral member and wheel supports for the wheel lift apparatus of FIG. 1.
Figure 9:
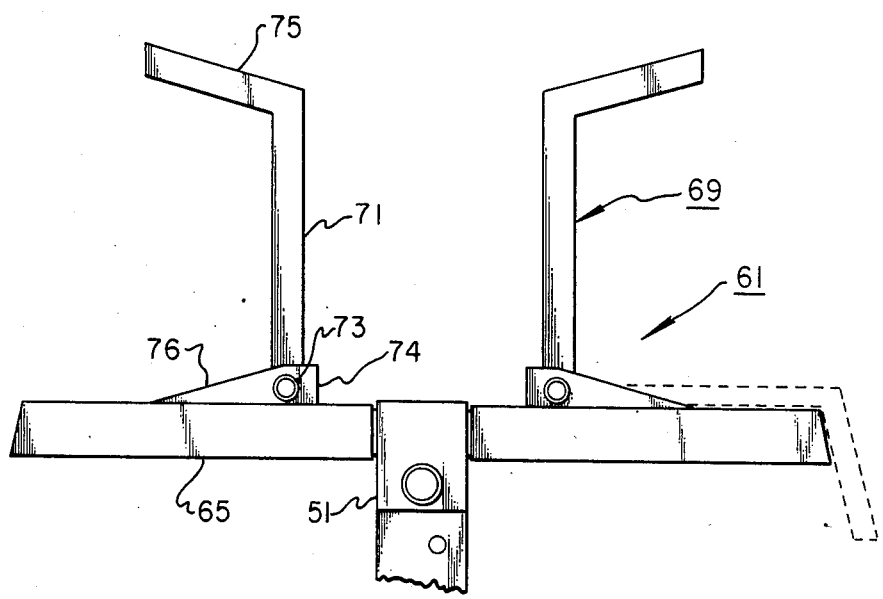
FIG. 9 is a view similar to FIG. 8, but without sectioning, and showing in dotted lines the storage position for the wheel supports.

Referring now to FIGS. 8 and 9, a lateral extension assembly 61 is mounted to the rearward member 51. The lateral extension assembly 61 includes a transverse tube 63 which is mounted perpendicular to the rearward member 51. Tube 63 is a square tubular member and it has an outer tube 65 closely received on each end. The outer tube 65 will slide telescopingly on the transverse tube 63. A pair of hydraulic cylinders 67 are mounted in the transverse tube 63, and have their opposite ends connected to the outer tubes 65 for extending and retracting the outer tubes 65. FIGS. 8 and 9 shows the lateral extension assembly 61 in a retracted position, while FIG. 1 shows the lateral extension assembly 61 in an extended position.

A wheel support 69 is connected to each outer tube 65. Each wheel support 69 has a forward member 71 that is connected to the outer tube 65 by a pivotal connection 73 with a bracket 74 mounted to each outer tube 65. Preferably, the pivotal connection 73 has a spring detent (not shown) that will snap the forward member 71 in the operational position perpendicular to the outer tube 65 as shown in FIG. 8. The pivotal connection will also allow the wheel support 69 to rotate 90 degrees to a storage position, shown by the dotted lines in FIG. 9. A free end or rearward member 75 is rigidly connected to the forward member 71. The rearward member 75 faces laterally outward when the forward member 71 is in the operational position shown in FIG. 8. The rearward member 75 intersects the forward member 71 at an obtuse angle c that is preferably about 110 degrees. The rearward surface 76 of bracket 74 is also at the same obtuse angle with respect to the longitudinal axis of the telescoping member assembly 45 (FIG. 1). The distance between the surface 76 and the rearward member 75 when in the operational position thus increases when proceeding outwardly in a lateral direction. The increasing distance accommodates different diameter wheels of vehicles.

In operation, to pick up the wheels of a vehicle, referring to FIG. 1, initially hydraulic fluid is supplied to the base hydraulic cylinder 25, causing the base 23 to move to the extended position shown in FIG. 1. Hydraulic cylinder 39 is actuated. The bars 35 and 37 lower the neck 33 as well as moving it rearward and tilting it downward, the assembly serving as vertical extension means for positioning the telescoping member 45 lower and rearward of the fully retracted position shown in FIG. 4. The wheel supports 69 are manually pivoted to the extended position shown in FIGS. 1, 8 and 9. Hydraulic fluid pressure is provided to hyraulic cylinders 53 and 57, shown in FIG. 7, causing the members 47, 49 and 51 to extend. The cylinders 53 and 57 and members 47, 49 and 51 serve as longitudinal extension means. The rearward member 51 may touch and slide along the ground surface during this extension. The lateral extension assembly 61 is moved between the wheels (not shown) of the vehicle. The extension of the telescoping member assembly 45 is stopped once the wheel supports 69 are aligned with the wheels of the vehicles and positioned inward.

Hydraulic fluid pressure is supplied to the hydraulic cylinders 67 (FIG. 8), causing the outer tubes 65 to move laterally outward. The rear edges of the wheels of the vehicle will contact the rearward members 75 and the forward edges of the wheels of the vehicle will contact the bracket surface 76. The wheel support 69 will enclose smaller wheels to somewhat greater extent than larger wheels. Once positioned, straps (not shown) are strapped about the wheel and frame to the lateral extension assembly 61. The hydraulic cylinder 39 (FIG. 5), may then be actuated to move the neck 33 to the retracted position. When retracting, the neck 33 will move forwardly and upwardly from the position shown in FIG. 3 to the position shown in FIGS. 4 and 5. If desired, the telescoping assembly 45 can also be retracted to some extent to position the towed vehicle as close as possible to the tow truck 11. When picked up, the vehicles having larger tires will not drop downward as much in the wheel support 69 as vehicles having smaller tires.

The cycle is reversed to uncouple the towed vehicle. To place the wheel lift in the storage position, as shown in FIG. 4, the wheel supports 69 are pivoted to the storage position shown by the dotted lines in FIG. 9. The hydraulic cylinder 67 (FIG. 8) for the lateral extension assembly 61 will be retracted. The hydraulic cylinders 53 and 57 (FIG. 7) for the telescoping member assembly 45 will be retracted. The hydraulic cylinder 39 (FIGS. 4 and 5) for the neck 33 will be retracted. The hydraulic cylinder 25 (FIG. 1) for the base 23 will be retracted. When fully retracted, as shown in FIG. 4, the arms 31 will be located just slightly rearward of the differential housing 77 of the tow truck 11. The lateral extension assembly 61 will protrude only a slight distance from the rear of the frame members 13 and the bed 15. The neck 33 is entirely located under the bed 15 in the storage position, and substantially all of the telescoping member assembly 45 is also located under the bed 15 in the storage position. The allows the mast and sling (not shown) of the tow truck 11 to be used conventionally.

The invention has significant advantages. The extension and retraction of the base combined with the extension and retraction of the neck, and the extension and retraction of the telescoping member assembly, allows the unit to be stored compactly under the bed so as to not interfere with the sling towing operations. The wheel supports will accommodate the wheels of various diameters. The wheel lift assembly can be readily installed on existing tow trucks. The wheel lift assembly is fast and easy to operate, requiring little manual assembly to lift the wheels of a vehicle for towing.

While the invention has been shown in only one of its forms, it should be apparent to those skilled in the art that it is not so limited but is susceptible to various changes without departing from the scope of the invention.

We claim:

1. A vehicle wheel lifting apparatus for a tow truck having a frame and a bed mounted thereon, the apparatus comprising in combination:
   a pair of laterally spaced apart longitudinal rails mounted to the frame under the bed;
   a base movably carried on the rails under the bed;
   telescoping means, mounted to the base and having a forward end and a lateral member extending laterally in opposite directions from a rearward end, for extending the lateral member in a rearward direction from the bed;
   a wheel support mounted on each end of the lateral member for supporting the wheels of a vehicle; and
   power means, including a hydraulic cylinder connected between the frame and the base for moving the base longitudinally relative to the frame on the rails between the retracted position wherein a substantial portion of the telescoping means locates under the bed for storage, to an extended position, wherein a substantial portion of the telescoping means locates rearward of the bed for towing, the base being fully supported by the rails and being located substantially under the bed in both the retracted and extended positions; and
   elevating means for raising and lowering the telescoping means relative to the base to selectively lift and lower the wheel supports.

2. The apparatus according to claim 1 wherein the base is slidably carried by the rails.

3. A vehicle wheel lifting apparatus for a tow truck having a frame and a bed mounted thereon, the apparatus comprising in combination:
   a pair of rails mounted to the truck under the bed;
   a base movably mounted to the rails;
   telescoping means, having a forward end and a rearward end with a lateral member extending laterally in opposite directions from the rearward end, for extending the lateral member in the rearward direction from the bed, the forward end being mounted to the base for movement therewith;
   a wheel support mounted on each end of the lateral member for supporting the wheels of a vehicle;
   hydraulic cylinder means for moving the base on the rails between a retracted position relative to the frame for storing the telescoping means, and an extended position relative to the frame for extending the telescoping means to lift wheels of the vehicle the base being fully supported by the rails in both the retracted and the extended positions; and
   elevating means on the rearward end of the base for simultaneously lowering and moving rearwardly the entire telescoping means relative to the base to lower the wheel supports, and for simultaneously raising and moving forward the entire telescoping means relative to the base to lift the wheel supports.

4. The apparatus according to claims 3 wherein the telescoping means comprises:
   inner and outer tubes telescopingly mounted to each other, with the lateral member located on the rearward end of the inner tube and the outer tube being mounted to the elevating means; and
   power means for extending and retracting the inner and outer tubes relative to each other.

5. A vehicle wheel lifting apparatus for tow trucks having a frame and a bed mounted thereon, the apparatus comprising in combination:
   a base carried by the frame, the base having a pair of spaced apart arms;
   a rigid neck member carried between the arms;
   pivotal support means connected between the arms and the neck member for allowing the neck member to move relative to the arms between retracted and extended positions, the extended position being rearward and lower than the retracted position;
   first hydraulic cylinder means connected between the base and the neck member for moving the neck member between the retracted and extended positions;
   a telescoping member assembly connected to the neck member and having a rearward end extending rearwardly from the neck member;
   second hydraulic cylinder means for moving the telescoping member assembly between retracted and extended positions relative to the neck member;
   a lateral member carried by the rearward end of the telescoping member assembly, having outer ends for extending laterally in opposite directions from the telescoping member assembly;
   a wheel mounted on each end of the lateral member for supporting wheels of a vehicle; and
   the pivotal support means also tilting the rearward end of the telescoping member assembly upward as the first hydraulic cylinder means retracts the neck member to lift the vehicle.

6. The apparatus according to claim 5 wherein the pivotal support means comprises four linkage bars connected between the neck member and the arms, two on each side of the neck member.

7. The apparatus according to claim 5 wherein the neck member has an axis that intersects the axis of the telescoping member assembly, the included angle between the intersecting axes rearward of the intersection being obtuse.

8. A vehicle wheel lifting apparatus for a tow truck having a frame and a bed mounted thereon, the apparatus comprising in combination:
   a pair of rails mounted to the truck under the bed parallel with the longitudinal axis of the truck;
   a base slidably mounted to the rails, the base having a pair of depending spaced apart arms;
   means for moving the base along the rails between retracted and extending positions;
   a neck member positioned between the arms;
   four linkage bars pivotally connected at each end between the neck member and the arms, two on each side, positioned to allow the neck member to move relative to the base between retracted and extended positions, the extended position placing the neck member lower and rearward of the retracted position;
   neck hydraulic cylinder means, including a hydraulic cylinder connected between the base and the neck member, for moving the neck member between the retracted and extended positions;
   a telescoping member assembly mounted to the rearward end of the neck member and extending rearwardly therefrom;
   telescoping hydraulic cylinder means for moving the telescoping member assembly between the retracted and extended positions relative to the neck member; and
   a lateral member mounted to the rearward end of the telescoping member assembly, having outer ends extending laterally in opposite directions from the telescoping member assembly;
   a wheel support mounted on each end of the lateral member for supporting wheels of a vehicle; and
   the linkage bars being positioned and dimensioned to cause the rearward end of the telescoping member assembly to tilt upwardly as the neck hydraulic means retracts the neck member, to lift the wheel supports and the vehicle.

9. The apparatus according to claim 8 wherein the linkage bars on each side of the neck member are of unequal length and are nonparallel when the neck member is in the retracted position.

10. The apparatus according to claim 8 wherein the linkage bars are positiond and dimensioned so that the neck member will tilt downward while in the fully extended position.

11. The apparatus according to claim 8 wherein the telescoping member assembly comprises:
   rearward, center and forward members telescopingly carried together; and
   wherein the telescoping hydraulic cylinder means comprises;
   a pair of hydraulic cylinders each having one end connected to the other cylinder, one of the hydraulic cylinders having its opposite end connected to the forward member and the other of the hydraulic cylinders having its opposite end connected to the rearward member, so that the application of hydraulic fluid pressure to the hydraulic cylinders simultaneously causes the forward and rearward members to move in opposite directions relative to the center member.

12. A vehicle wheel lifting apparatus for a tow truck having a frame and a bed mounted thereon, the apparatus comprising in combination:
   a base carried by the truck under the bed;
   extension means for moving the base longitudinally relative to the frame between a retracted position and an extended position;
   a telescoping member assembly carried by the base for movement therewith, having a rearward, a center, and a forward member telescopingly carried together;
   a pair of hydraulic cylinders, each having one end connected to the other cylinder, one of the hydraulic cylinders having its opposite end connected to the forward member and the other of the hydraulic cylinders having its opposite end connected to the rearward member, so that the application of hydraulic fluid pressure to the hydraulic cylinders simultaneously causes the forward and rearward members to move in opposite directions relative to the center member;
   a lateral member carried by the telescoping member assembly at its rearward end, having outer ends extending laterally in opposite directions from the telescoping member assembly;
   a wheel support mounted on each end of the lateral member for supporting wheels of a vehicle; and
   elevating means for raising and lowering the telescoping member assembly relative to the truck to lift and lower vehicle carried on the wheel supports.

13. The apparatus according to claim 12 wherein the hydraulic cylinders are located inside the members.

14. The apparatus according to claim 12 further comprising:
   hydraulic cylinder means for moving the opposite ends of the lateral members and the wheel supports between extended and retracted positions.

15. A vehicle wheel lifting apparatus for a tow truck having a frame and a bed mounted therein, the apparatus comprising in combination:
   a base carried by the frame;
   telescoping means having a forward end and a rearward end, for extending the rearward end rearward from the bed, the forward end being mounted to the base;
   an extensible lateral member assembly mounted to the rearward end of the telescoping means and extending in opposite directions;
   a wheel support mounted to each end of the lateral member assembly, each wheel support having an inner portion pivotally mounted to the lateral member assembly for movement between a storage position parallel with the lateral member assembly to an active position perpendicular to the lateral member assembly, and each wheel support having an outer portion that extends laterally outward from the inner portion, the outer portion intersecting the inner portion at an obtuse angle; and
   hydraulic cylinder means for extending the lateral member assembly from a retracted position to an extended position pushing the wheel supports while in the active position outwardly into contact with the inner edges of wheels of the vehicle to lift the vehicle, the obtuse angle between the inner and outer portions of the wheel supports providing a distance between each outer portion and the lateral member assembly that converges substantially for receiving between them wheels of different diameters.

16. The apparatus according to claim 15 wherein the lateral member includes a bracket on each end to which the wheel supports are pivotally mounted, the bracket having an inclined surface that faces away from the lateral member for receiving one edge of a wheel of a vehicle, the inclined surface and the outer member defining between them a distance that converges substantially in directions toward the inner member when the wheel support is in the active position.

17. The apparatus according to claim 15 wherein each inner portion of each wheel support is mounted to a rearward side of the lateral member assembly to extend rearwardly when the wheel support is pivoted to the active position.

* * * * *